(12) United States Patent
Ijdo et al.

(10) Patent No.: US 7,258,733 B2
(45) Date of Patent: Aug. 21, 2007

(54) VISCOSITY STABLE SMECTITE CLAY SLURRIES

(75) Inventors: Wouter Ijdo, Hamilton, NJ (US); Wilbur S. Mardis, Holland, PA (US); Fred Whitton, Pt. Pleasant, NJ (US)

(73) Assignee: Elementis Specialties, Inc., Highstown, NJ (US)

( * ) Notice: Subject to any disclaimer, the term of this patent is extended or adjusted under 35 U.S.C. 154(b) by 0 days.

(21) Appl. No.: 10/620,617

(22) Filed: Jul. 17, 2003

(65) Prior Publication Data

US 2004/0016369 A1  Jan. 29, 2004

Related U.S. Application Data

(63) Continuation of application No. 10/223,722, filed on Aug. 20, 2002, now abandoned, which is a continuation of application No. 09/756,610, filed on Jan. 8, 2001, now abandoned.

(51) Int. Cl.
  *C04B 14/00* (2006.01)
  *C04B 33/02* (2006.01)
  *C04B 33/04* (2006.01)

(52) U.S. Cl. ............... 106/487; 106/486; 106/468; 423/332

(58) Field of Classification Search ............ 106/486, 106/468, 487; 423/332
See application file for complete search history.

(56) References Cited

U.S. PATENT DOCUMENTS

| | | | | |
|---|---|---|---|---|
| 2,885,360 | A * | 5/1959 | Haden, Jr. et al. | 508/136 |
| 3,713,859 | A * | 1/1973 | Hoover et al. | 106/468 |
| 4,127,422 | A * | 11/1978 | Guzi et al. | 524/47 |
| 4,434,075 | A * | 2/1984 | Mardis et al. | 516/100 |
| 4,964,918 | A * | 10/1990 | Brown et al. | 106/669 |
| 5,423,911 | A * | 6/1995 | Coutelle et al. | 106/416 |
| 5,582,638 | A * | 12/1996 | Coutelle et al. | 106/287.17 |
| 5,669,942 | A * | 9/1997 | McCullough | 51/307 |
| 6,024,790 | A * | 2/2000 | Allen et al. | 106/416 |
| 6,077,884 | A * | 6/2000 | Hess et al. | 523/417 |

FOREIGN PATENT DOCUMENTS

| | | | |
|---|---|---|---|
| JP | 49-107024 | * | 10/1974 |
| JP | 59-7085 | * | 1/1984 |

* cited by examiner

*Primary Examiner*—Michael Marcheschi
(74) *Attorney, Agent, or Firm*—Morgan, Lewis & Bockius LLP

(57) ABSTRACT

A clay slurry is described using smectite clay, water, and a defined phosphonate additive that is hydrolytically stable over time. The viscosity of the clay slurry remains pourable and relatively unchanged over time compared to prior art slurries. The slurry is useful to provide rheological control to paints and coatings and is particularly useful as an anti-bleed additive for concrete.

13 Claims, No Drawings

VISCOSITY STABLE SMECTITE CLAY SLURRIES

CROSS-REFERENCE TO RELATED APPLICATIONS

This application is a continuation of Ser. No. 10/223,722 filed on Aug. 20, 2002, now abandoned, which is a continuation of Ser. No. 09/756,610 filed on Jan. 8, 2001, now abandoned.

FIELD OF INVENTION

The present invention is directed to a smectite clay slurry containing additives that stabilize the viscosity of such clay slurry. These slurries are useful in coatings, construction, water treatment and other areas where dry smectite clays have been used in the past and is particularly useful as an anti-bleed additive for concrete.

BACKGROUND OF INVENTION

Smectite clays are commercially important minerals, bentonite and hectorite in particular. Appropriately processed, smectite clays are excellent viscosifiers, binders, film formers, fabric softeners, and retention aid additives. These clays are 2:1 type layer silicates with an expandable structure. They are highly colloidal and may readily swell in water to form viscous, thixotropic gels which renders the clays useful as viscosity builders in many industries. For instance, they are used to provide rheological control in coatings, cosmetics, drilling muds, greases, suspension aids, agricultural sprays and the like.

By smectite clays we mean natural bentonite and hectorite clays. These natural smectite clays are products that are formed by, for instance, the decomposition of igneous rocks. Therefore, clays are relatively abundant in the environment but their chemical composition may vary from deposit to deposit. Even clay samples taken within one clay deposit can differ from each other. These chemical variations result in for instance, differences in clay layer charge composition and density, impurity content and crystallite sizes. To counteract such variations, some smectite-like clays have been synthesized on an industrial scale. Such synthetic clays are uniform in charge density and are virtually impurity free. As a result, synthetic clays behave very differently from natural clays when used as, for instance, a Theological additive.

A crude natural smectite clay includes both clay and impurities. Such a crude clay can be beneficated or purified so that some or all of the impurities in the crude clay have been removed.

Most smectite clays are sold as fine powders. As with most minerals, however, these powders are difficult and expensive to handle. To provide the user of the clay with a product which is more ready for the user's application, clays have been sold by the manufacturer or distributor as aqueous slurries. Such slurries can be easily stored, shipped, transferred, e.g. pumped and metered, with significantly less capital expenditure and many fewer problems than are associated with dry mineral powders.

Generally, however, it is not economical or practical to ship smectite clays as aqueous slurries because of the large quantity of water normally present in such slurries. This problem arises because smectites are indeed good viscosifiers of water at low loadings; for this reason it has not generally been possible to produce aqueous slurries high in clay solid by the usual methods. In general, the viscosities of the slurries become so high that they cannot readily be pumped by conventional equipment and gelling upon standing becomes a problem. Obviously it is desirable from an economic perspective to produce an aqueous clay slurry high in clay content.

Clay dispersions in water containing around 3 to 5 wt. % clay form viscous gels. The gelling has been prevented in the past by adding a peptizing agent—it is known that metaphosphates, citrates, polyacrylates etc. cause a significant reduction in clay slurry viscosity when added to a clay dispersion. Of these peptizing agents, tetrasodiumpyrophosphate (TSPP) is by far the most effective dispersant in reducing the clay slurry viscosity. However, TSPP hydrolyzes slowly to orthophosphate, which is ineffective in reducing clay slurry viscosity. The viscosity of a clay slurry which is treated with TSPP increases over time and often the slurry becomes then unusable.

Among the prior art that is pertinent to the present invention are the following patents.

U.S. Pat. No. 6,024,790 discloses an alkaline earth bentonite that can be activated by the use of sodium citrate or other organic sequestering agents as an activator. Dry blends of the activator and the bentonite are disclosed.

U.S. Pat. No. 5,779,785, incorporated by reference in its entirety, discloses an aqueous slurry of smectite clay of elevated solids content comprising an aqueous solution or emulsion of a salt of a low molecular weight amine salt and a smectite clay. The amine salt prevents the smectite from swelling appreciably, whereby the slurry can be shipped and stored.

U.S. Pat. No. 5,582,638, incorporated by reference in its entirety, discloses a thickening agent that is based on at least one synthetic phyllosilicate that contains at least one additive from a disclosed group of organic phosphorus compounds, including hydroxyethane-1,1-diphosphonic acid and hydroxyethane disphosphonic acid sodium salt.

U.S. Pat. No. 5,391,228 discloses a method for preparing a time-stable, low-viscosity, pumpable high solids aqueous bentonite slurry. The aqueous solution comprises at least a first and second salt component in which there is dispersed a powdered bentonite. The first salt component is selected to give, if used alone, a low viscosity to the slurry. The second salt component is selected to act in combination with a first salt component to further decrease the viscosity of the specified high solids content or to increase the solids content while maintaining the low viscosity.

U.S. Pat. No. 5,223,098 discloses a bentonite swelling clay provided to a paper making mill as a fluid concentrate containing more than 15% bentonite. Swelling of the bentonite is prevented by an inorganic electrolyte in the concentrate, and the bentonite swells upon dilution either before or after addition of the cellulosic suspension.

U.S. Pat. No. 5,266,538 discloses a smectite clay in an elevated solids aqueous slurry that is composed of smectite clay slurried or dispersed in water containing a non-dispersant salt of a monovalent cation, such as sodium chloride. This patent teaches that a dispersant salt results in high viscosity since the dispersant end of the molecule tends to disperse loose aggregates of smectite.

U.S. Pat. No. 5,151,218 discloses phosphoric acid esters and their salts that can be used as dispersants or dispersing aids in paints and molding compositions.

SUMMARY OF INVENTION

The present invention is directed to aqueous natural smectite clay slurries which exhibit virtually no increase in viscosity upon aging. These slurries are prepared using specific phosphonate additives.

DETAILED DESCRIPTION OF INVENTION

The objective of the present invention is to provide a stable pumpable, pourable, fully-activated smectite clay dispersion that contains at least 2 wt. % clay. This invention fills a need for smectite clay slurries having a large smectite clay solids content.

Such a smectite clay slurry is advantageous because (1) more clay can be shipped per unit volume; (2) the slurry is particularly effective as an anti-bleed additive for concrete; (3) paint and coatings producers may add the clay slurry as a liquid rheological additive during the let down stage instead of during the grind stage in formulating water-based paints; and (4) end users experience greater formulation freedom (i.e., less water is associated with the rheological additive).

The invention has been found particularly useful in certain construction projects that require the use of highly fluid cement/sand systems. Such fluid systems are used in self leveling cement floors and in pumpable concrete systems. Normally, an additive is added to these fluid systems to prevent settling of the aggregates and excessive bleed water formation. When excessive bleed water forms at the surface of cement or concrete, it results in poor surface appearance and poorer performance in terms of wear resistance, cracking and compressive strength. A smectite clay added to a highly fluid cement system acts as an anti-bleed modifier and provides a significant decrease in the amount of bleed water. Normally, dry clay, sand, cement, aggregate and water are mixed in appropriate amounts on the job site just before pouring or placing of the concrete takes place. However, it proves to be difficult to fully activate the clay on the job site under normal mixing conditions, probably due to high levels of calcium ions released when water is added to portland cement. It is therefore advantageous to have a fully activated clay slurry ready where the mixing occurs for addition to the cement system. Such a slurry may easily be incorporated, even as a post additive, without the need for special mixing equipment.

The present invention is directed to a smectite clay slurry using defined phosphonate additives. One embodiment of the invention is a smectite clay slurry, comprising:

(a) at least 2 wt. % of one or more smectite clays, active clay basis;
(b) from about 0.5 to 15 wt. % based on the weight of the smectite clay of one or more phosphonates; and
(c) water.

In the inventive embodiments, element (a), the smectite clay, is a natural hydrous phyllosilicate and includes the smectite clays, hectorite and bentonite. Naturally occurring smectite clay can contain impurities—in calculation of the percentages below only the pure clay portion of either crude clay or beneficated clay, either of which can be used in this invention, is utilized.

According to the present invention, the clay slurry composition comprises from above two to about 25 wt. % smectite clay, 100% active clay basis. Blends of smectite clays can be used. Preferably, the clay slurry contains about 2-20 wt. % smectite clay. More preferably, the clay slurry contains about 10-15 wt. % smectite clay and when bentonite is the sole clay used preferably 5-10 wt. %. Smectite clay and idealized formulae for the smectite clays, bentonite and hectorite, are given in U.S. Pat. Nos. 5,718,841 and 5,735,943 issued to the assignee of the instant invention, hereby incorporated by reference.

For a beneficiated smectite clay, like BENTONE HC which is almost 100% active natural hectorite clay, it becomes difficult to process the slurry much above 20 wt % clay and extremely difficult above 25 wt % clay because of viscosity. If one uses crude clay, then the upper clay limit depends on the concentration of clay that is present in the crude clay. A crude clay, such as BENTONE CT, contains around 50 percent clay while the remainder are impurities, predominantly calcite; as stated, we define the upper limit as percent active clay.

The high solids smectite clay slurry according to the present invention contains, based on the active smectite clay weight content, from about 0.5 to 15 wt. %, preferably 3 to 6 wt. % of a phosphonate additive. The phosphonate additive may be in the form of a solution or powder.

Element (b), phosphonate additives useful for this invention include the phosphonic and phosphinic derivatives within the group of organic phosphorus oxoacids. In this invention, we use the more generally accepted definition of phosphonic acid as being an organic phosphorus derivative such as $RPO(OH)_2$.

Organic derivatives useful as dispersant additives in the production of the inventive clay slurries are selected from the group consisting of:

Phosphonate compounds that contain at least two moieties having the structure —$PO(OH)_2$, and salts thereof.

Phosphinate compounds that contain at least two moieties having the structure

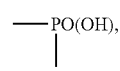

and salts thereof, and

Compounds which may form phosphonic or phosphinic acids, or salts thereof, under the conditions of use in making these slurries.

Particularly useful are the organic phosphorus derivatives with the following formula:

Diphosphonic acids of formula $R^1R^2C(PO(OH)_2)_2$ and their salts

Diphosphonic acids of formula $R^1$—$CR^2(PO(OH)_2)$—$R^3$—$CR^2PO(OH)_2$—$R^1$ and its salts Phosphonic acid salts with general formula $R^1R^4C=C(PO(O^-)_2)_2$ where $R^1$ can be selected from the group comprising H, a linear or branched alkyl, alkene, hydroxyalkyl, aminoalkyl, hydroxyalkene, aminoalkene with 1 to 22 carbon atoms or an aryl, hydroxyaryl, aminoaryl with 6 to 22 carbon atoms; $R^2$ can be selected from the group comprising $R^1$ and OH; $R^3$ is an alkyl with 0 to 22 carbon atoms and $R^4$ can be selected from the group $R^1$.

The most preferred additives for this invention includes 1-hydroxyethane-1,1-diphosphonic acid along with its salts and its esters. Such products include the commercial products Dequest 2010, 2016 and 2016D. The especially preferred phosphonate additive is 1-hydroxyethylene-1,1-diphosphonic acid tetra sodium salt (CAS# 3794-83-0).

Element (c) is water. It should be understood that the slurry in many cases can include other materials such as biocides, fillers and organic solvents, to name just a few.

The clay slurries of this invention are speculated to have the phosphonate additive chemisorbed on the clay layer edges upon exposing the additive to the clay. It is further assumed that the additives form a negatively charged layer on the clay platelet edges by chemisorption of the phosphonate on such layer edges. It is also speculated that the additives, when incorporated into an end use formulation, such as concrete or paint systems, partition themselves to other surfaces of the formulation thereby reactivating the rheological properties of the clay.

A clay slurry with reduced viscosity is readily produced when the clay and additive are mixed in water using a turbine mixer, a Cowles dispersator or the like. If a further reduction of the clay slurry viscosity is desired, the slurry may even be sheared with, for instance, a Manton-Gaulin homogenizer as shown by the examples below, or treated with a Cowles dispersator or the like for extended periods of time until the desired slurry viscosity is obtained.

In the present invention, the pH of the clay dispersion should be preferably, depending on the type of smectite clay, above about 4.5, more preferably above 5.5, and most preferably in the range of about 6 to about 11.

According to the present invention, several approaches are available to the production of the clay slurries. For example, one could disperse either unbeneficiated (i.e. natural crude smectite clay with impurities) or beneficiated natural smectite clay with the additive of this invention in water. Alternatively, dried clay and the additive can be added to a clay slurry to obtain a slurry with increased solids content. Conversely, sufficient additive could be added to a clay slurry of lower solids where after the slurry could be concentrated. For instance, concentration is achieved when the slurry is "partially" dried to drive of water till a desired solids content is reached. In a particularly preferred embodiment of the present invention, it is desirable to first purify crude hectorite and use it at such a solids level in the presence of the additive so that the purified clay slurry would contain around 20 wt. % clay.

The inventive smectite clay slurries can be used in water-based paints to provide rheology, and may be added at any stage during the paint making process, including the let-down. The clay slurry used as a Theological additive in water-based paints is preferably a purified hectorite. Such a hectorite slurry is also useful as an anti-bleed additive for concrete.

The following examples are provided to illustrate our invention. Other embodiments of the invention will be apparent to those skilled in the art from consideration of the specification and practice of the invention disclosed herein. It is intended that the specification and examples be considered as exemplary only, with a true scope and spirit of the invention being indicated by the claims.

EXAMPLES

Example 1

Five percent by weight of a natural beneficiated hectorite clay (BENTONE® MA) was dispersed in deionized water using a Cowles dispersator at 3000 rpm for 10 minutes. For comparison, a dispersant additive was first dissolved in deionized water prior to clay addition. The amount of additive used was 3% by weight based on the amount of clay which was to be added next. Using the same clay incorporation method as described before, 5% by weight of natural hectorite clay (BENTONE® MA) was dispersed into the solution. The additives used are listed in table 1. Clay slurry viscosities were measured using a TA instruments $CSL^2$-100 controlled stress rheometer. All clay slurries were aged for 24 hours before measuring the room temperature viscosity at four different shear rates. The results are listed in table 1.

The data shows that the three phosphonate inventive additives are very effective in reducing the clay slurry viscosity. The sodium citrate additive, a well known conventional dispersant aid, is not quite as effective.

TABLE 1

| Additive used | Viscosity [Pa · s] | | | |
| --- | --- | --- | --- | --- |
| | 100 [$s^{-1}$] | 250 [$s^{-1}$] | 500 [$s^{-1}$] | 750 [$s^{-1}$] |
| No additive | 0.399 | 0.184 | 0.107 | 0.079 |
| Sodium citrate | 0.295 | 0.127 | 0.074 | 0.056 |
| Tetrasodium pyrophosphate | 0.035 | 0.028 | 0.023 | 0.021 |
| Amino tri(methylene-phosphonic acid) pentasodium salt | 0.045 | 0.033 | 0.025 | 0.022 |
| 1-Hydroxyethylene-1,1,-diphosphonic acid tetra sodium salt | 0.056 | 0.040 | 0.032 | 0.028 |
| Diethylenetriamine penta (methylenephosphonic acid) pentasodium salt | 0.086 | 0.040 | 0.026 | 0.021 |

Example 2

The clay incorporation procedure of example I was repeated but now 5% by weight of a beneficiated, sodium exchanged, natural bentonite clay was dispersed in deionized water. For comparison, 5% percent of the natural bentonite clay was dispersed into additive solutions that contained four weight percent additive based on clay weight. The resulting clay slurry viscosity data appears in table 2. Similar results are obtained in that the phosphate and phosphonate are more effective in reducing the slurry viscosity than the citrate additive.

TABLE 2

| Additive used | Viscosity [Pa · s] | | | |
| --- | --- | --- | --- | --- |
| | 100 [$s^{-1}$] | 250 [$s^{-1}$] | 500 [$s^{-1}$] | 750 [$s^{-1}$] |
| No additive | 0.511 | 0.217 | 0.125 | 0.094 |
| Sodium citrate | 0.407 | 0.169 | 0.098 | 0.073 |

TABLE 2-continued

| Additive used | Viscosity [Pa · s] | | | |
|---|---|---|---|---|
| | 100 [s$^{-1}$] | 250 [s$^{-1}$] | 500 [s$^{-1}$] | 750 [s$^{-1}$] |
| Tetrasodium pyrophosphate | 0.134 | 0.093 | 0.070 | 0.059 |
| Amino tri(methylene-phosphonic acid) pentasodium salt | 0.195 | 0.112 | 0.078 | 0.063 |
| 1-Hydroxyethylene-1,1,-diphosphonic acid tetra sodium salt | 0.118 | 0.085 | 0.065 | 0.055 |
| Diethylenetriamine penta (methylenephosphonic acid) pentasodium salt | 0.198 | 0.115 | 0.081 | 0.067 |

Example 3

This example repeats the exact same procedure as example 1, except this time 10% by weight of hectorite clay (BENTONE® MA) slurries were produced. The viscosity data for the clay slurries is shown in table 3. This time, when 10% by weight of a natural hectorite clay (BENTONE® MA) was dispersed in deionized water, the clay gel became too thick to obtain a homogeneous slurry. Thus, this clay gelled too much and no viscosity measurement was obtained.

For comparison, the slurry samples that contained a dispersing additive did not become too thick and formed homogeneous slurries. The results also show that the tetrasodium 1-hydroxyethylene-1,1-diphosphonate additive is very effective in reducing the clay slurry viscosity. However, the inventive pentasodium amino tri(methylene phosphonic acid) and pentasodium diethylenetriamine penta (methylenephosphonic acid) dispersants are also quite effective in reducing the clay slurry viscosity when compared to the dispersant free clay gel.

10% per weight Hectorite clay slurry was prepared where the dispersant was tetrasodium 1-hydroxyethylene-1,1-diphosphonate.

For comparison, a 10% by weight hectorite clay slurry was made with a tetrasodium pyrophosphate solution (4% by weight of TSPP based on clay weight) using a Cowles dispersator at 3000 rpm for 10 minutes, where after the slurry was sheared with a Manton-Gaulin homogenizer using 4500 psi shearing pressure. Analogous, a similar slurry was made where the dispersant was tetrasodium 1-hydroxyethylene-1,1-diphosphonate.

The viscosity data of the four slurries is reported in table 4. The data indicates that the slurry viscosity is effectively reduced by the Manton Gaulin homogenizer. We speculate that the distribution of the dispersant is improved and that all clay is activated upon homogenizing.

TABLE 3

| Additive used | Viscosity [Pa · s] | | | |
|---|---|---|---|---|
| | 100 [s$^{-1}$] | 250 [s$^{-1}$] | 500 [s$^{-1}$] | 750 [s$^{-1}$] |
| No additive | too thick | too thick | too thick | too thick |
| Tetrasodium pyrophosphate | 0.314 | 0.185 | 0.127 | 0.102 |
| Amino tri(methylene-phosphonic acid) pentasodium salt | 0.535 | 0.225 | 0.128 | 0.097 |
| 1-Hydroxyethylene-1,1,-diphosphonic acid tetra sodium salt | 0.229 | 0.140 | 0.096 | 0.078 |
| Diethylenetriamine penta (methylenephosphonic acid) pentasodium salt | 0.839 | 0.350 | 0.198 | 0.148 |

Example 4

Ten percent by weight of a natural hectorite clay (BENTONE® MA) was dispersed in a tetrasodium pyrophosphate

TABLE 4

| Additive used | Treatment | Viscosity [Pa · s] | | | |
|---|---|---|---|---|---|
| | | 100 [s$^{-1}$] | 250 [s$^{-1}$] | 500 [s$^{-1}$] | 750 [s$^{-1}$] |
| Tetrasodium pyrophosphate | Cowles | 0.270 | 0.156 | 0.108 | 0.088 |
| | Homogenizer | 0.076 | 0.051 | 0.036 | 0.029 |
| 1-Hydroxyethylene-1,1,-diphosphonic acid tetra sodium salt | Cowles | 0.164 | 0.104 | 0.074 | 0.061 |
| | Homogenizer | 0.061 | 0.043 | 0.032 | 0.027 |

(TSPP) solution using a Cowles dispersator at 3000 rpm for 10 minutes. The TSPP solution contained 4% by weight of TSPP based on the amount of clay. In a similar manner, a The pH of the clay slurry can be adjusted to a desired level. In some embodiments, the pH is adjusted to above 5.5. In other embodiments, the pH is adjusted to between 6 and 11. Preferably, the pH is adjusted by adding HCl, $H_3PO_4$, $H_2SO_4$, or $CH_3COOH$.

Example 5

In this example, the stability of the two homogenized slurries of example 4 is evaluated. The slurries were aged at room temperature and at 50° C., both for a period of 4 weeks. Table 5 contains data for the fresh and aged slurries treated with either the prior art tetrasodium pyrophosphate or the inventive tetrasodium 1-hydroxyethylene-1,1-diphosphonate dispersants. Clearly, the slurry treated with pyrophosphate increases in viscosity upon aging, both at room temperature and at 50° C. For comparison, the hectorite clay slurry treated with the phosphonate dispersant remains stable since the data indicates no significant changes in slurry viscosity.

TABLE 5

| Additive used | Aging | Viscosity [Pa · s] | | | |
|---|---|---|---|---|---|
| | | 100 [$s^{-1}$] | 250 [$s^{-1}$] | 500 [$s^{-1}$] | 750 [$s^{-1}$] |
| Tetrasodium pyrophosphate | Fresh | 0.076 | 0.051 | 0.036 | 0.029 |
| | Room Temp | 0.239 | 0.099 | 0.054 | 0.040 |
| | 50° C. | 0.409 | 0.166 | 0.088 | 0.061 |
| 1-Hydroxyethylene-1,1-diphosphonic acid tetra sodium salt | Fresh | 0.061 | 0.043 | 0.032 | 0.027 |
| | Room Temp | 0.069 | 0.046 | 0.033 | 0.027 |
| | 50° C. | 0.067 | 0.046 | 0.035 | 0.030 |

Example 6

Fifteen percent by weight of a natural hectorite clay (BENTONE® MA) was dispersed in a 1-hydroxyethylene-1,1-diphosphonate solution using a Cowles dispersator at 3000 rpm for 10 minutes. The phoshonate solution contained 2% by weight of phosphonate salt additive based on the amount of clay. Next, the slurry was sheared with a Manton-Gaulin homogenizer at 4500 psi shearing pressure.

For comparison, 15% by weight hectorite slurries were made using the same procedure, but now, 3, 4, 5, 6 or 7 wt % by weight phosphonate additve was used based on clay weight. The viscosities of these slurries were measured at four shear rates with a TA instruments $CSL^2$-100 controlled stress rheometer and are given in table 6. To reduce the slurry viscosity most efficiently, the data indicates that the optimum concentration of phosphonate dispersant additive is between three and six percent by weight, based on the clay weight in the slurry.

TABLE 6

| Weight percent of 1-Hydroxyethylene-1,1,-diphosphonic acid tetra sodium salt | Viscosity [Pa · s] | | | |
|---|---|---|---|---|
| | 100 [$s^{-1}$] | 250 [$s^{-1}$] | 500 [$s^{-1}$] | 750 [$s^{-1}$] |
| 2 | 0.726 | 0.356 | 0.211 | 0.158 |
| 3 | 0.506 | 0.267 | 0.165 | 0.125 |
| 4 | 0.563 | 0.305 | 0.191 | 0.145 |
| 5 | 0.547 | 0.304 | 0.193 | 0.148 |
| 6 | 0.492 | 0.260 | 0.162 | 0.124 |
| 7 | 0.623 | 0.324 | 0.200 | 0.152 |

Example 7

Fifteen percent by weight of a natural hectorite clay (BENTONE® MA) was dispersed in a 1-hyroxyethylene-1,1-diphosphonate solution (3% by weight of phosphonate based on the amount of clay) using the incorporation procedure as described in example 8. This procedure is here designated as method I.

Clay slurry production method II consists of dry mixing 97% by weight hectorite clay and 3 wt % by weight 1-hydroxyethylene-1,1-diphosphonate tetrasodium salt. Next, the mixture was the dispersed using the Cowles and homogenizer to obtain a 15% by weight clay slurry.

In comparison, method III involves the production of a 5% by weight hectorite slurry, free to additive, as described in example 1. To this slurry, 1-hydroxyethylene-1,1-diphosphonate tetrasodium salt and clay were added to obtain a 15 wt % by weight Hectorite clay slurry (the amount of phosponate salt was 3% by weight based on clay) using the Cowles and Manton Gaulin homogenizer. The slurry viscosities were measured and are presented in table 7.

The data indicates that comparable slurry viscosities obtained by all three production methods.

TABLE 7

| Slurry production method | Viscosity [Pa · s] | | | |
|---|---|---|---|---|
| | 100 [$s^{-1}$] | 250 [$s^{-1}$] | 500 [$s^{-1}$] | 750 [$s^{-1}$] |
| I | 0.506 | 0.267 | 0.165 | 0.125 |
| II | 0.505 | 0.262 | 0.162 | 0.123 |
| III | 0.498 | 0.261 | 0.161 | 0.122 |

Example 8

For comparison to the slurry production methods described in example 8, this example describes a slurry production method IV that involves concentration of a clay slurry. First, a 5% by weight hectorite clay slurry free of dispersant additive was produced in a manner as described in example 1. To this slurry, tetrasodium 1-hydroxyethylene-1,1-diphosphonate was added (3% by weight of phosphonate based on the amount of clay) before this slurry was homogenized with the Manton Gaulin at 4500 psi shearing pressure. Next, the slurry was concentrated by evaporating water. During the concentration process, samples were taken to determine the percent clay solids in the slurry and to monitor the slurry viscosity. This data appears in table 8.

The results show that slurries are obtained with viscosities in the line as are expected based on the other three production methods. It is understood that the concentration of the clay slurry is by no means limited to the evaporation of water.

TABLE 8

| Weight percent clay solids | Viscosity [Pa · s] | | | |
|---|---|---|---|---|
| | 100 [s$^{-1}$] | 250 [s$^{-1}$] | 500 [s$^{-1}$] | 750 [s$^{-1}$] |
| 4.8 | 0.008 | 0.006 | 0.005 | 0.005 |
| 9.5 | 0.057 | 0.040 | 0.030 | 0.026 |
| 13.9 | 0.308 | 0.175 | 0.113 | 0.089 |
| 20.0 | 1.365 | 0.602 | 0.346 | 0.254 |

Example 9

In this example, a 25% by weight crude Hectorite (BENTONE® CT) clay slurry is made by dispersing the crude clay into a tetrasodium 1-hydroxyethylene-1,1-diphosphonate solution (2% by weight of phosphonate based on the amount of crude clay) using a Cowles dispersator at 3000 rpm for 15 minutes. The crude clay has an active clay content of about 50% by weight. The other solids in the crude clay is predominantly calcite. For comparison, clay slurries were made with the same composition, except this time a turbine mixer was used for 15 minutes. Slurries were made at room temperature and at 65° C. The RVT#1 Brookfield viscosities were measured for all slurries and are shown in table 9. Clearly, the dispersant is effective in reducing the viscosity of the active clay even though a large quantity of calcite solids is present in the slurry. The data indicates that all slurries are freely flowable liquid clay dispersions.

TABLE 9

| Slurry production method | RVT#1 Brookfield viscosity [cp] | | |
|---|---|---|---|
| | 10 rpm | 50 rpm | 100 rpm |
| Cowles dispersator | 4600 | 1800 | 1200 |
| Turbine mixer at room temperature | 9800 | 3480 | 2220 |
| Turbine mixer at 65° C. | 8000 | 2810 | 1840 |

Example 10

As a further aspect of the invention, it is found that the dispersed clay is useful in many applications that benefit from fully activated clay. Although the clay slurries contain the phosphonate dispersant that allows for viscosity reduction, the clay can be activated and used as a thickening agent to provide rheological control. This is illustrated by using the slurry in highly fluid cement systems where the clay acts as an anti-bleed modifier. Crude hectorite clay (BENTONE® CT), and the room temperature turbine mixed clay slurry produced in example 11, were used to compare the effectiveness of the slurry to suspend sand and cement particles. The efficiency of the clay as an anti-settling agent was determined by measuring the amount of bleed water that forms due to settling of the aggregates in highly fluid cement. Different amounts of clay were used to fully explore the efficiency differences between the dry crude clay and the activated clay slurry. The cement was prepared with a Hobart mixer (paddle speed 1) and the general cement formulation is presented in table 10. The bleed water volume was determined by pouring the cement mix into graduated sample holders and measuring the aggregate level in time. The bleed water volume is expressed as percent from the total volume and the measurement are presented in table 11.

Evaluating this data, it is clear that the clay slurry is more effective as an anti-settling, anti-bleed agent than the dry crude clay without a dispersant.

TABLE 10

| Component | Parts |
|---|---|
| Water | 175 |
| Sand (#80) | 100 |
| Crude clay or clay slurry (BENTONE® CT) | 1, 2, 4 or 8 |
| Portlant cement (type I) | 100 |

TABLE 11

| Rheological additive | Settling time | Percent of bleed water per amount of clay in the cement formulation | | | |
|---|---|---|---|---|---|
| | | 1 part | 2 part | 4 part | 8 parts |
| Dry crude clay | 10 min | 16 | 6 | 2 | 2 |
| | 1.0 h | 28 | 22 | 16 | 6 |
| | 24 h | 28 | 24 | 18 | 12 |
| 25 wt % crude clay slurry | 10 min | 6 | 2 | 0 | 0 |
| | 1.0 h | 22 | 16 | 6 | 0 |
| | 24 h | 24 | 18 | 12 | 6 |

Example 11

The clay slurry of this invention is also useful as a rheological additive in water based paints. This example demonstrates that the presence of the viscosity reducing dispersant in the clay slurry does not negatively affect the clay action as a rheological additive. In fact, clay activated in a slurry form is advantageous as the slurry may be pumped into the paint formulation process during, for instance, the paint let-down. A dry clay can not be added during the let-down, since the clay needs to be activated. The action of the clay slurry was compared to the performance of dry clay in a solvent-free high pigment latex paint. The formulation of this paint is given in table 12. A dry hectorite clay (BENTONE® MA) was used as a rheological additive and added during the paint grind. For comparison, a fifteen percent by weight natural hectorite clay (BENTONE® MA) was dispersed in a 1-hydroxyethylene-1,1-diphosphonate solution (3% by weight of phosphonate based on the amount of clay) using the incorporation method 1. This clay slurry was then added to the paint in the mill base or as a post-add. Stormer and Brookfield paint viscosity data is given in table 13.

It is evident that the clay slurry is effective in thickening solvent-free latex paint. The viscosity reducing agent of the clay slurry does not negatively impact the clay in controlling the rheology of the paint. In addition, it is possible to add the clay slurry to the paint during the let-down since the clay is fully activated.

TABLE 12

| Raw material | Percent by weight | Material function |
| --- | --- | --- |
| Water | 20.5 | — |
| Calgon N | 0.1 | Dispersing agent |
| Parmetol A 26 | 0.1 | Biocide |
| Pigmentverteiler A | 0.1 | Dispersing agent |
| Agitan 280 | 0.4 | Defoamer |
| Clay | 0.4 | Rheological additive |
| Kronos 2190 | 7.5 | TiO$_2$ pigment |
| Durcal 2 | 12.5 | Extender |
| Durcal 5 | 15.0 | Extender |
| Omya Hydrocarb | 7.5 | Extender |
| Talkum IT extra | 4.5 | Extender |
| Socal P 2 | 5.0 | Extender |
| Aluminum Silicate P 820 | 2.0 | Extender |
| Mowilith LDM 1871 | 12.0 | Pva/ethylene binder |
| Water | 12.2 | — |
| NaOH (10% sol.) | 0.2 | Neutralizing agent |

TABLE 13

| | Stormer KU [krebs] | | | RVT#1 Brookfield viscosity 10 rpm [cp] | | |
| --- | --- | --- | --- | --- | --- | --- |
| Clay additive | 1 day | 3 days | 7 days | 1 day | 3 days | 7 days |
| Dry clay (mill base) | 88 | 86 | 92 | 7600 | 9500 | 11000 |
| Clay slurry (mill base) | 95 | 95 | 95 | 13200 | 13500 | 15500 |
| Clay slurry (post-add) | 95 | 97 | 100 | 18800 | 18000 | 24000 |

The invention thus being described, it will be obvious that the same may be varied in many ways. Such variations are not to be regarded as a departure from the spirit and scope of the invention and all such modifications are intended to be included within the scope of the claims.

What is claimed is:

1. A method of making a smectite clay slurry of a naturally occurring clay, comprising:
   (a) dispersing one or more naturally occurring smectite clays, one or more phosphonate additives and water to form a clay slurry;
   (b) shearing the clay slurry; and
   (c) adjusting a pH of the clay slurry to above 5.5.

2. A method according to claim 1, wherein the naturally occurring smectite clay is hectorite.

3. A method according to claim 1, wherein the phosphonate additive is 1-hydroxyethylene-1,1-diphosphonic acid tetra sodium salt.

4. A method of making a smectite clay slurry of a naturally occurring clay according to claim 1, wherein the shearing is performed by a Gaulin homogenizer.

5. A method of making a smectite clay slurry of a naturally occurring clay, comprising:
   (i) dispersing one or more naturally occurring smectite clays and one or more phosphonate additives with water to form a clay slurry, wherein the phosphonate additives are selected from the group consisting of:
      a) Diphosphonic acids of formula $R^1R^2C(PO(OH)_2)_2$,
      b) Disphosphonic acids of formula $R^1\text{—}CR^2(PO(OH)_2)\text{—}R^3\text{—}CR^2PO(OH)_2\text{—}R^1$,
      c) salts thereof, and
      d) Phosphonic acid salts of formula $R^1R^4C\text{=}C(PO(OH)_2)_2$,
   where $R^1$ is selected from the group consisting of H, a linear or branched alkyl, alkene, hydroxyalkyl, aminoalkyl, hydroxyalkene, aminoalkene with 1 to 22 carbon atoms and an aryl, hydroxyaryl, aminoaryl with 6 to 22 carbon atoms; $R^2$ is selected from the group consisting of $R^1$ and OH; $R^3$ is an alkyl with 0 to 22 carbon atoms; and $R^4$ is selected from the group $R^1$; and
   (ii) shearing the clay slurry; and
   (iii) adjusting a pH of the clay slurry to above 5.5.

6. The method of claim 1, further comprising preparing a dry mix of the naturally occurring clay and one or more phosphonate additives prior to dispersing with water.

7. The method of claim 5, further comprising preparing a dry mix of the naturally occurring clay and one or more phosphonate additives prior to dispersing with water.

8. The method of claim 1, wherein at least one of the one or more naturally occurring smectite clays are sodium exchanged clays.

9. The method of claim 1, further comprising adjusting the pH of the clay slurry to between 6 and 11.

10. A method of making a smectite clay slurry from a naturally occurring clay, comprising:
    (a) dispersing one or more sodium exchanged naturally occurring smectite clays, one or more phosphonate additives and water to form a clay slurry;
    (b) shearing the clay slurry; and
    (c) adjusting a pH of the clay slurry to above 5.5.

11. The method of claim 5, further comprising adjusting the pH of the clay slurry to between 6 and 11.

12. The method of claim 1, wherein the pH of the clay slurry is adjusted by adding HCl, $H_3PO_4$, $H_2SO_4$, or $CH_3COOH$.

13. The method of claim 5, wherein the pH of the clay slurry is adjusted by adding HCl, $H_3PO_4$, $H_2SO_4$, or $CH_3COOH$.

* * * * *